H. C. WAITE.
VEHICLE CONSTRUCTION.
APPLICATION FILED JULY 20, 1916.
1,315,437.
Patented Sept. 9, 1919.
3 SHEETS—SHEET 3.
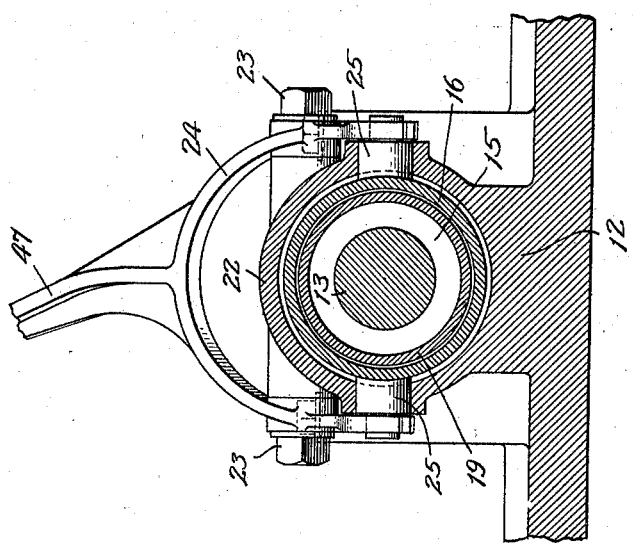
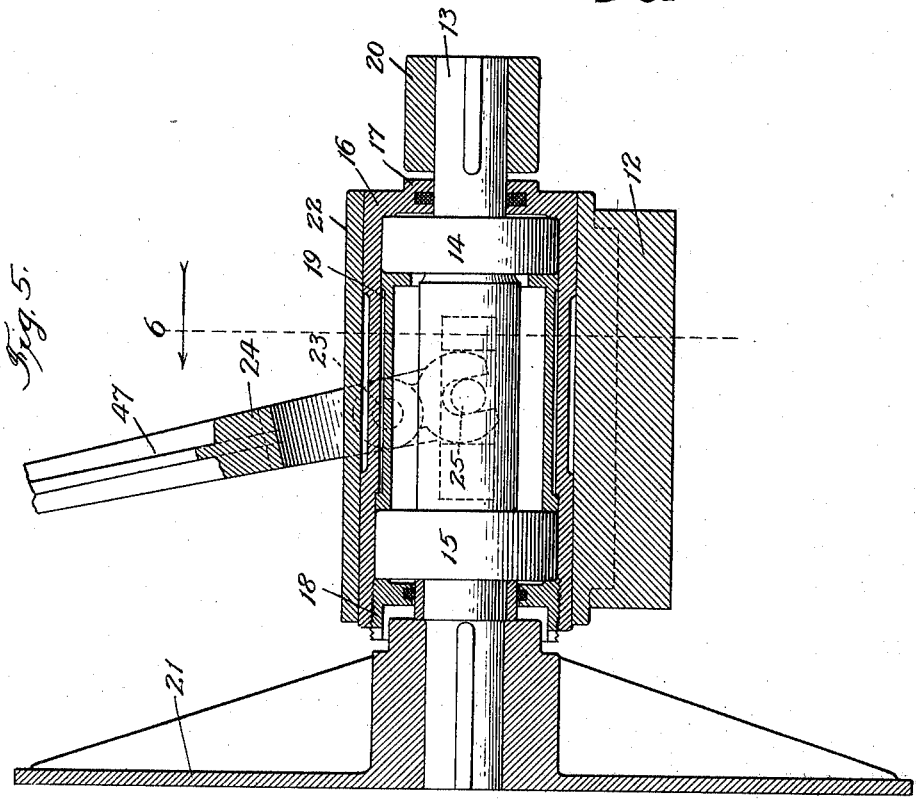
Witnesses:
Inventor:
Harry C. Waite,
By Dyrenforth, Lee, Chritton and Wiles
Att'ys.

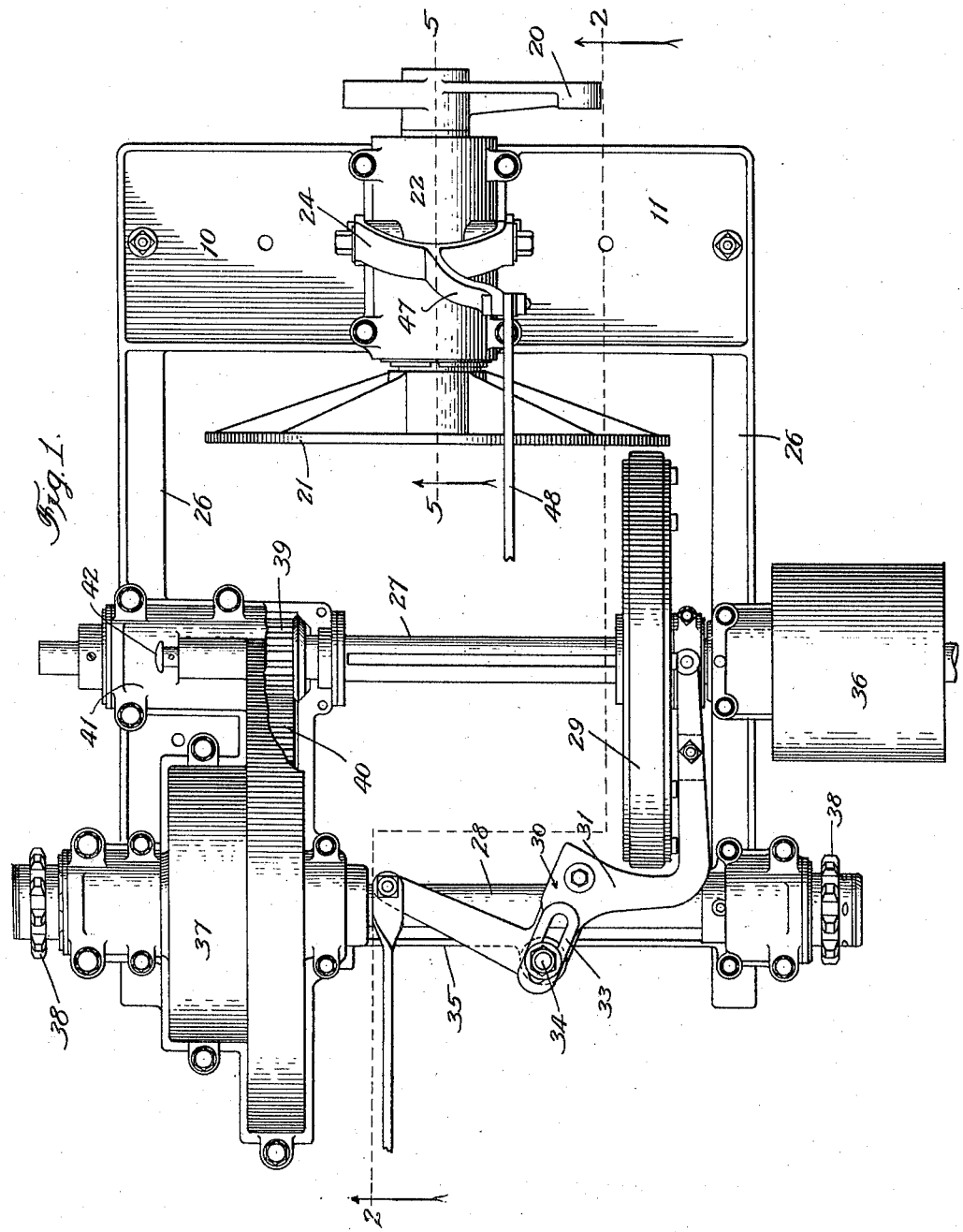

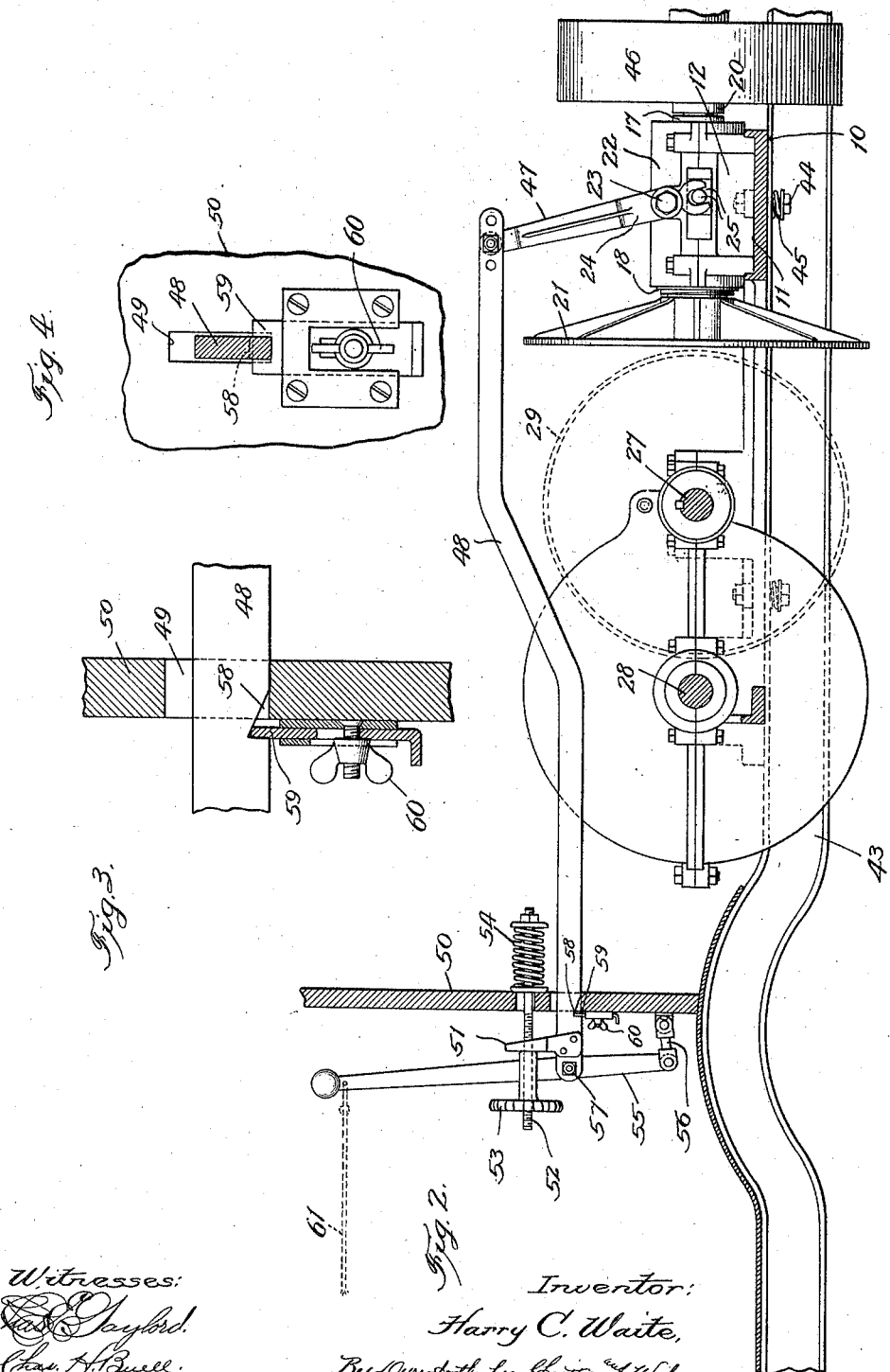

UNITED STATES PATENT OFFICE.

HARRY C. WAITE, OF CHICAGO, ILLINOIS, ASSIGNOR, BY MESNE ASSIGNMENTS, TO ELGIN TRACTOR CORPORATION, A CORPORATION OF NEW YORK.

VEHICLE CONSTRUCTION.

1,315,437. Specification of Letters Patent. Patented Sept. 9, 1919.

Application filed July 20, 1916. Serial No. 110,399.

*To all whom it may concern:*

Be it known that I, HARRY C. WAITE, a citizen of the United States, residing at Chicago, in the county of Cook and State of Illinois, have invented a new and useful Improvement in Vehicle Construction, of which the following is a specification.

My invention relates to vehicle construction, and more particularly to the arrangement of the transmission mechanism within the vehicle frame. The specific object of the invention is to provide an improved construction and arrangement of friction transmission, adaptable to such vehicles as agricultural tractors. The invention will be more fully understood from the following detailed description, taken in connection with the accompanying drawings, in which—

Figure 1 is a plan view of my transmission assembly, parts of the housing being broken away; Fig. 2 is a longitudinal section through the frame of the vehicle, showing the manner in which the assembled structure shown by Fig. 1 is mounted therein, the latter being shown substantially on the line 2—2 of Fig. 1; Fig. 3 is an enlarged detail section of a clutch-control rod showing the latch-plate for locking the same; Fig. 4 is an enlarged face view of the latch-plate structure shown in Fig. 3, the clutch-control rod being sectioned; Fig. 5 is an enlarged section on the line 5 of Fig. 1; and Fig. 6 is a section on the line 6 of Fig. 5.

Referring more particularly to the drawings, in Fig. 1 there is shown a generally rectangular frame 10, which I prefer to form as an integral casting strengthened by suitable webs, as shown. The front transverse member 11 of the frame has cast integrally therewith the lower half 12 of a slide-bearing which supports the drive-shaft 13. As shown in Fig. 5, the shaft 13 is provided with front and rear bearings 14 and 15, respectively, which may be ball-bearings of the combined radial and thrust type, lying within a sleeve 16 flanged at the front end as shown at 17 and having an annular nut 18 closing its rear end. A spacer-sleeve 19 which fixes the position of the bearings 14 and 15 lies within the sleeve 16. The front end of the drive-shaft 13 has keyed thereto one member 20 of a universal-joint or flexible coupling which is designed to be connected with a mating member carried by the engine fly-wheel, as will later appear. The rear end of the drive-shaft has keyed thereto a friction disk 21. For holding the parts in the assembled position an upper semi-cylindrical slide bearing member 22 (Figs. 1 and 2) is bolted to the lower member 12, the parting line being preferably along a horizontal plane passing through the center of the shaft, and the cover section 22 of the slide bearing member carries studs 23 on which there is pivoted for movement in a longitudinal vertical plane a yoke 24, the depending ends of which are slotted to receive the reduced extremities of the studs 25, which are secured in or formed integrally with the sleeve 16. The meeting edges of the two sections 12 and 22 of the slide bearing are provided with notches which form slots in which the studs 25 may move as they are shifted forwardly by the tilting of the yoke 24.

Arranged transversely of the frame 10 and carried in suitable bearings, the lower halves of which are preferably cast integrally with the longitudinal members 26 thereof, are a pair of parallel shafts 27, 28, which I designate, respectively, countershaft and jack-shaft. The counter-shaft has splined thereon a friction-drum 29 arranged in operative relation to the friction disk 21 and designed to be shifted across the face of the latter to provide variable driving ratios and reverse driving, as is well understood. For effecting such shifting of the friction drum 29 there is provided a bell-crank lever 30 and an angularly bent arm 31, the outer end of which is bifurcated and has its ends embracing and pivoted to a collar 32 rotatably mounted within a groove in the hub of the drum 29. In view of the straight-line motion impressed upon the end of the arm 31 by its pivotal connections with the drum-collar 32 it is necessary to provide a slotted pivot for the bell-crank lever 30. Such slotted pivot is shown at 33, a pivot-stud 34 mounted in the rear transverse member 35 of the frame 10 supporting the stud.

One end of the jack-shaft 27 is projected beyond the side frame member 26, and the projecting end has keyed thereto a pulley 36, by which arrangement the counter-shaft may be used as a driving member for machinery extraneous to the tractor or other vehicle in which the transmission is mounted.

The jack-shaft 28 is formed in two sections which are connected by a differential gearing housed within a casing 37 having its lower half cast integrally with the frame and its upper half bolted thereto. Both ends of the jack-shaft are projected beyond the lateral frame members 26 and are provided with driving sprockets 38, which may be connected by chains with sprockets on the driving-wheels of the vehicle in a well understood manner. The jack-shaft construction per se forms no part of my invention and is therefore described only in so far as is necessary to explain its coöperation with the other elements of my combination. For driving from the counter-shaft 27 to the jack-shaft 28 there are provided meshing spur gears 39, 40, the former being splined upon the counter-shaft and the latter being bolted to or otherwise rigidly fastened to the differential of the jack-shaft. The housing 37 of the differential is preferably extended to include a housing portion 41 which incases the counter-shaft gear 39, the housing being of sufficient size to permit this gear to be shifted toward the adjacent side frame member 26 until it is free of the jack-shaft gear 40. For effecting this shifting of the counter-shaft gear and for locking it in either the operative or inoperative position, there is provided a shifter-rod 42, having a shifter-fork within the housing 41, which engages a groove in the hub of the gear 39, as is more particularly shown and described in my prior Patent No. 1,191,858, July 18, 1916.

The complete transmission, including the drive-shaft 13, counter-shaft 27, and jack-shaft 28, all properly assembled within the frame 10, as shown in Fig. 1, is designed to be mounted longitudinally in a vehicle-frame, as illustrated in Fig. 2. The frame 10 will preferably be so proportioned with relation to the vehicle frame that the lateral members 26 thereof will overlie the longitudinal channel bars 43 of the vehicle frame, and the frame 10 will then be secured to the vehicle frame as by bolts 44, which are preferably drawn up against relatively heavy coil springs 45 (Fig. 2), so that the vehicle frame may undergo a certain limited twisting movement without straining the transmission unit 10. The frame 10 will preferably be mounted in the vehicle frame just behind the engine fly-wheel 46, and a universal joint or flexible coupling member will be secured to the latter for coöperation with the coupling 20 of the drive-shaft 13.

For operating the yoke 24 the latter is provided with an upstanding arm 47, to which is connected a clutch-rod or link 48, which extends rearwardly and passes through an aperture 49 in the dash-board 50 of the vehicle. The projecting end of the link 48 has secured thereto a foot 51, through which passes a threaded rod 52, the outer end of which caries a hand-wheel 53, and the inner end of which, behind the dash-board 50, is provided with a coil-spring 54 of the compression type. For manually operating the link 48 there is provided a hand-lever 55, secured to the base of the dash-board as by a short link 56, and having pivotal connection with the end 57 of the clutch-link 48.

In order to lock the clutch-link 48 in the position shown in Fig. 2, the lower edge of the latter is notched as at 58 (Fig. 3), the notch being adapted to engage over the end of an adjustable latch-plate 59 fastened to the front face of the dash-board and adapted to be secured in any position of adjustment by a wing-nut 60.

A cable shown in dotted lines in Fig. 2, and designated 61 may be attached to the upper end of the hand-lever 55 for operating the latter from a distance.

In the manufacture of a vehicle embodying my improved construction, the frame 10 will first be machined as a unit, which may be conveniently and economically done by the modern processes, using jigs and the like fixtures, which serve to insure absolute accuracy and standardization. The driving-shaft 13, counter-shaft 27 and jack-shaft 28, and their related members, will then be assembled within the frame 10, as shown in Fig. 1, and by reason of the fact that these parts are all carried by the integral frame casting, their relationship will be fixed and the time and labor which is ordinarily consumed in effecting those adjustments necessary to secure perfect alinement and spacing of the parts will be saved. This consideration is of the utmost importance in connection with friction transmissions of the type shown, for the reason that it has been found to be absolutely essential to the successful operation of such a transmission that the driving-shaft 13 and counter-shaft 27 thereof shall lie in exactly the same plane and at exactly ninety degrees with relation to one another. The minutest variations in these conditions cause wholly disproportionate difficulties in operation and maintenance.

The transmission unit having been assembled within the frame 10 as described, is properly mounted in the chassis frame 43 of the vehicle and secured thereto by spring-held bolts 44, the coupling member 20 of the drive-shaft 13 being then connected with the coupling of the fly-wheel.

The flexible or yielding connections (the spring-held bolts 44) which secure the transmission frame 10 to the frame of the vehicle are particularly necessary and desirable in the case of agricultural tractors for the reason that this type of vehicle customarily travels over rough ground, and the frame is thereby subjected to the most severe twisting. By my construction the twisting strains impressed upon the vehicle frame do not distort the transmission frame nor disturb the alinement of the shafts therein.

In the operation of a vehicle equipped with my transmission the friction disk 21 is normally held in engagement with the drum 29 by the tension of the spring 54 on the rear side of the dash-board 50, this spring acting through the link 48 to rock the yoke-arm 47 and thereby shift the sleeve 16, which carries with it as a unit the drive-shaft 13 and the bearings 14 and 15 thereof. The contact pressure between the drum and disk may be conveniently adjusted to suit the conditions under which the vehicle is operating, by adjusting the hand-wheel 53, which, by reason of its position on the front of the dash-board, may be easily reached at all times by the operator of the machine. This convenient adjustment of the force of the driving engagement between the parts of the friction transmission, I consider to be of great importance, for the reason that this type of transmission would wear unduly if it were at all times operated under the extreme pressure needed for emergency conditions. Where the adjustment of the pressure between the driving faces can only be made by the use of tools or by dismounting from the machine and removing the hood or floor-board, or other casing, it is found in practice that the machine driver or operator will customarily employ greater driving pressure than is required for average service, and the bearings and friction surfaces are therefore subjected to unnecessarily heavy loads, and furthermore, the mechanical efficiency of the transmission is lower.

In the position of the parts shown in Fig. 2 of the drawing the driving disk 21, which, in such a friction transmission has also the function of a clutch, is shown in the inoperative position, being so maintained against the tension of the spring 54 by the latch-plate 59, which is in engagement with the notch 58. To permit the disk 21 to return to operative position it is necessary to lift the hand-lever 55, the link connection 56 at the bottom thereof permitting such motion, and thereby release the notch 58 from the latch-plate.

In such vehicles as agricultural tractors to which my construction is particularly applicable, it is of importance that the motor may be used as a source of power for driving machinery extraneous to the tractor, such as threshers, ensilage-cutters, etc. It is further of advantage that the clutch and transmission mechanism of the tractor be capable of controlling the operation of such machinery, as is more fully explained in my prior application referred to. The provision of the pulley 36 upon the projecting end of the counter-shaft 27 accomplishes these desirable results. In such use of the tractor the counter-shaft 39 will be disengaged from the jack-shaft gear 40 by shifting the former outward by means of the shifter-rod 42. It is further of advantage, when using the tractor-motor as a driver for extraneous machinery to be able to control the clutch, that is, the engagement of the driving disk and drum, from a position remote from the tractor, for instance, from the thresher or cutter which is being driven. This may be accomplished in my construction by the simple expedient of attaching a cable 61 to the hand-lever 5. When such control is being used the latch-plate 59 should be lowered to inoperative position in order that the clutch-link 48 will not automatically lock itself in the retracted position.

While I have shown and described in considerable detail one specific embodiment of my invention, it is to be understood that this showing and description is illustrative only, and for the purpose of making my invention more clear, and that I do not regard the invention as limited to these details nor to any of them except in so far as I have included such limitations within the terms of the following claims, in which it is my intention to claim all novelty inherent in my invention as broadly as is permissible in view of the prior art.

What I claim is:

1. A transmission unit adapted to be mounted in and supported wholly from the frame of a vehicle and comprising in combination a frame, a drive-shaft carried in bearings therein, a counter-shaft carried in bearings therein and transversely of the drive-shaft, a friction disk carried by one of said shafts, a friction-drum carried by the other shaft, means for shifting the drum across the face of the disk, a jack-shaft parallel to said counter-shaft and also carried in bearings in said frame, and driving connections between the counter-shaft and jack-shaft.

2. A transmission unit adapted to be mounted in and supported wholly from a vehicle frame, and comprising a frame, a drive-shaft mounted longitudinally therein, a coupling carried by the outer end of the drive-shaft, and adapted to be connected to an engine, a friction disk carried by the inner end of the drive-shaft, means for shifting said drive-shaft in the direction of its length within the said frame, a counter-shaft mounted in the said frame in the plane of the drive-shaft at right angles thereto and having one of its ends extended beyond the frame, a friction drum splined upon the counter-shaft, means for moving the drum across the face of the said disk, a pulley mounted upon the extending end of the counter-shaft, a jack-shaft mounted in the said frame parallel to the counter-shaft, driving connections between the counter-shaft and jack-shaft, and means for releasing said driving connections whereby the said pulley may be used for driving purposes without driving the said jack-shaft.

3. In a vehicle and in combination, a frame, a drive-shaft mounted longitudinally therein and adapted for connection at its forward end to the motor of the vehicle, a friction disk carried by the rear end of the said shaft, a counter-shaft arranged transversely of the drive-shaft, a friction drum mounted on said counter-shaft in operative relation to the said disk, a dashboard back of the said counter-shaft, a link having connection at its forward end with the drive-shaft, a hand-lever back of the said dashboard and having connection with the rear end of the said link, a spring having one end connected with the said link for urging the latter in a direction to cause engagement of the drum and disk, and means located at the rear of the dashboard for adjusting the tension of the said spring.

HARRY C. WAITE.

Copies of this patent may be obtained for five cents each, by addressing the "Commissioner of Patents, Washington, D. C."